Patented Feb. 20, 1934

1,948,292

UNITED STATES PATENT OFFICE 1,948,292

PROTECTIVE COATING AND PROCESS FOR MAKING AND APPLYING THE SAME

William C. Geer, Ithaca, N. Y.

No Drawing. Application January 31, 1933, Serial No. 654,457, and in Canada July 3, 1928

67 Claims. (Cl. 91—68)

This invention relates to the treatment of rubber and rubber articles and more particularly to a process for treating an article having a rubber or rubber-like surface to improve the characteristics of the article and of its surface.

Attempts have been made to treat unvulcanized rubber, gutta percha or other similar materials with sulphur chloride and similar compounds to vulcanize the surface, but such treatment results in an unpolishable surface having a high coefficient of friction.

It is an object of the present invention to provide an improved method for treating articles of rubber, balata, gutta percha, and similar materials, to produce a non-thermoplastic coating or film which will present a smooth, dry, hard surface, and also to provide an article having improved characteristics.

It is another object to provide a procedure whereby the hardness and polishability of the surface treated may be accurately controlled in accordance with the characteristics sought to be imparted to the article.

It is also an object of the invention to provide an article having a surface to which dirt, stains, etc., will adhere less easily than to a surface of untreated rubber or a surface coated with paint or varnishes. Another object is to give to an article of rubber or similar material a surface that is more resistant to oil.

It is a further object of the invention to provide a method for the treatment of a vulcanized rubber containing an excess of sulphur, by which "blooming" may be inhibited. Another object is to provide a method whereby the speed and convenience of treatment may be increased and other improvements and economies may be accomplished in the treatment of rubber and similar surfaces. Other objects will become apparent.

In describing the invention particular reference will be made to its use in connection with the treatment of the surface of a golf ball having a cover composed largely of balata, although it may be used to advantage in the treatment of other rubber or rubber-like articles, such, for example, as other types of balls, overshoes, tires, heels and soles of shoes, automobile tops and seat covers, insulating materials, etc., having surfaces of, or containing, rubber, balata, gutta percha or similar materials, where it is desired to improve the characteristics of the article or its surface. The invention is particularly adapted to the treatment of soft vulcanized rubber, balata, etc., that is, rubber, balata, etc., containing not over about 5% of sulphur (based on the content of rubber, balata, etc.) as compared with hard vulcanized rubber containing, for example 50% of combined sulphur. It is not intended, however, to limit its use to a particular sulphur content, since it may be used advantageously with rubber containing no sulphur or with rubber containing more than 5% sulphur, particularly where a portion of the sulphur is uncombined.

A standard golf ball is produced in a well-known manner by tightly wrapping a stretched rubber thread or band about a core of a suitable material and applying a cover of a balata composition to the wound center. Since it is important that the golf ball have a white surface, it has been the practice for many years to apply a coating of white paint to the balata surface in order to give it the desired color and a smooth dry surface having a low coefficient of friction. It is difficult, if not impossible, to apply such a coating evenly to the surface of the golf ball, and a slight variation in thickness will greatly affect the accuracy and extent of the flight of the ball. Also, a coating applied in this manner will chip off after the ball has been used a short time, particularly where it is exposed to moisture, and will leave a discolored ball with even greater variations in the thickness of the coating upon different portions of the ball. Also, because of exposure of the balata surface, dirt will adhere to it.

Many suitable materials of varying composition are known for use as the cover of the golf ball. These may be made up, as is well known in this art, with or without sulphur, plasticizers and/or accelerators, depending upon the particular characteristics desired. To these may be added a suitable pigment, for example, titanium dioxide, zinc oxide, lithopone or barium sulphate, etc., or mixtures of these and/or other suitable pigments. Examples of suitable compositions are given in my applications Serial Nos. 208,659 and 542,192, filed July 26, 1927 and June 4, 1931, respectively, and a further example of such a composition is as follows:

| | Parts |
|---|---|
| Resin free gutta percha or balata | 100 |
| Pale crepe rubber | 20 |
| Titanium dioxide | 40 |
| Zinc oxide | 10 |

A rubber composition of the desired color and physical characteristics, for example as referred to above, may be used directly as the cover of the ball or it may be made into a cement according to well known methods, for example, by stirring about 10 grams of the above mixture into about 100 cc. of a suitable solvent, for instance, benzol. Such a cement or a cement prepared as described in my application Serial No. 208,659, or any other rubber, balata, etc. cement of proper color and characteristics may be applied as a coating to a ball produced in the usual manner. When the composition is used as the cover of the ball it may be moulded, and if sulphur or other vulcanizing agent is used it may be vulcanized, to give the desired configuration and characteristics. When the composition is used as a paint, it may be applied before or after the final molding of the cover and may be vulcanized if desired.

The ball with the above cover or coating is now to be dipped into a dilute organic solution of a halogen salt of a amphoteric metal. The latter will directly combine with the rubber and/or balata hydrocarbon of the surface, or will polymerize the said hydrocarbon, or will yield a portion of the elements of its structure to the said hydrocarbon. These three reactions are mentioned because it is probable that each of them may play some part in the process to be described. The balls or other articles may be dipped singly or they may be treated in bulk and while they are in contact with each other. A perforated container or a bag may be used for dipping the balls and it is preferable to provide some means for agitating or moving them relative to each other while they are in contact.

As a specific example of such treatment a dry golf ball having a cover or coating of vulcanized or unvulcanized, pigmented, balata-rubber mixture, may be immersed for one to two minutes in a solution of about two per cent by weight of anhydrous tin tetrachloride in pure, water free, ethylene dichloride. On removing the ball from this solution it will be yellow in color. The excess of tin tetrachloride may be removed by immersion of the ball in pure ethylene dichloride and the ball may be dipped into 95 per cent ethyl alcohol or in acetone and allowed to remain there for five or more minutes. On removal it will be found to have the color of the original compound, assuming that the pigments added are insoluble and do not react with the solvents in which the ball is immersed.

After drying, the surface of the ball may be found to be slightly dull in appearance, depending upon the cleanness and polish of the mold. This dullness may be removed and a high gloss given to the ball by rubbing it with a cloth or by otherwise polishing it. The surface of the ball treated in this manner will be smooth, dry, hard and free from tackiness, and the surface will be varnish-like in character.

If it is desired to speed up the treatment a more concentrated solution may be applied for a shorter time, for example, the balls or other articles may be dipped into an 8% solution of tin tetrachloride, by volume, in ethylene dichloride, for about 30-45 seconds.

With a treatment as described above, a hard, tough, resistant coating or film is produced and is found to adhere strongly to the unchanged rubber, even after repeated flexing. I have also found that the character or nature of this film may be controlled by the solvent in which the tin tetrachloride or other amphoteric halide is dissolved. Solutions using solvents such as carbon disulphide, carbon tetrachloride and aliphatic saturated hydrocarbons, which swell rubber, balata or gutta percha, are undesirable since they retard the reaction so much that the resulting film is not hard or dry, and the coefficient of friction is essentially unchanged. I prefer to use ethylene dichloride but other solvents, such as other halogen derivatives of hydrocarbons containing at least one hydrogen atom per molecule, which do not react with the halide of the amphoteric metal and which permit the halide of the amphoteric metal to react with the rubber, may be substituted for or used with the ethylene dichloride, for example, ethylene trichloride, monochlorbenzene, and $\alpha$-chloronaphthalene, isoamylchloride, penta-, tri-, or tetrachlorethane, etc. may be used and will produce films having the desired characteristic of dryness, without being brittle. Other organic halogen derivatives, such as chloral orthochlorphenol, dichlorethyl ether, etc. have been found to be useful in this connection. Toluene, xylene, gasoline, kerosene, and other liquid hydrocarbons of the aliphatic and cyclic series, when they do not form liquid or solid non-reacting addition products with the halides of the amphoteric metals, may be used in place of ethylene dichloride in some cases but because they retard the rate of addition (or reaction) of the tin tretachloride with rubber and swell the rubber so largely, they are not useful for surface treatment except in mixtures with ethylene dichloride or other similar hydrocarbon halides.

I have also found another class of solvents which may be used with or in place of the ethylene dichhloride and which retards the rate of the reaction of the halide of the amphoteric metal with the rubber, balata, etc. This class includes the solvents which react with the halide of the amphoteric metal to form addition or other reaction products and which slowly yield that halide to the balata or rubber. These solvents are referred to herein as the reacting solvents, as compared with the solvents, such as ethylene dichloride, which do not react with the halide of the amphoteric element and which are referred to as non-reacting solvents. The reacting solvents do not, as a rule, swell the balata or rubber. With some of them heat is generated when the halide is added to the solvent. The members of this group which are particularly useful appear to be those to which the halide of the amphoteric metal adds directly or those which form decomposition products to which the halide adds directly.

Some of these solvents form colored liquid addition products which may or may not be used, depending upon the desired color of the finished product. Others form colored liquid addition products but the rubber, balata, etc., compound treated with them is easily decolorized and the original color regenerated by the washing with acetone or alcohol. Others form solid addition products with the halide and may be used only in solution in another neutral solvent, as ethylene dichloride.

In general, these substances include the esters of the carboxylic acids, the esters of the halogen substituted carboxylic acids and the alcohols, ketones or phenols and certain hydrocarbons. Examples of these solvents are:

Ethyl-, butyl-, or amylacetate, N-butyl-, or ethyl chloracetate, N-butyl-, ethyl-, or isopropyl alcohol, tricresyl phosphate, isopropyl benzoate, acetone, paracymene, decahydronaphthalene, dimethyl cyclohexane, cyclohexane, phenetole, and anisol.

As an example of the use of a reacting solvent, the article may be dipped for about 10 minutes to an hour or more in a solution containing about 10% above equal molecular proportions of anhydrous tin tetrachloride in ethyl acetate. The article may then be dipped into acetone for about 30 minutes and thereafter washed with water. As another example of the use of such a solvent, 25 parts by volume of tin tetrachloride may be mixed with 45 parts of N-butyl alcohol. This mixture forms a non- (or but slightly) fuming solution at a little above normal room temperature and may be used at about 40° C. to form the desired film, after which the surface of the article may be washed with acetone or other suitable solvent.

When non-fuming, or but slightly fuming, solutions are desired for dipping or for application to the surface of a large rubber article which is too large to dip practically, such as tires, floor covering, etc., I may use tin tetrachloride in a mixture of solvents of which the following is an example:

| | Parts by volume |
|---|---|
| Tin tetrachloride | 5 |
| Normal butyl alcohol | 9 |
| α chloronaphthalene | 10 |

Such a solution may be applied to the surface of a rubber article and after remaining on the surface for ten or more minutes may be washed off with acetone or other similar reacting solvent, when there will be found a surface of a polishable polymer as has been described. Ethylene dichloride, or other similar hydrocarbon halide may be substituted for the α chloronaphthalene depending upon the particular rate of evaporation desired.

An increase in the concentration of the halide of the amphoteric element will increase the hardness and brittleness of the film, while an increase in the proportion of the reactive solvent will retard the reaction and decrease the hardness and brittleness of the product. The reacting solvents have different characteristic rates of retardation of the reaction so that by a proper choice and regulation of proportions of the reactive and non-reactive solvents, and of the halide of the amphoteric element, a film may be produced on the surface of the rubber article which may vary in hardness and flexibility over nearly any desired range, from a film which is soft and extensible to one which is hard and tough. The depth of the film will depend upon the rapidity of the reaction and the penetration of the solution, so the thickness of the film may be controlled by the proper selection of the solvent and proportions of tin tetrachloride and by regulating the length of time the article is subjected to the solution.

With a solution of an amphoteric halide in a mixture of a reacting and non-reacting solvent, for example, a solution containing 36 parts by volume of ethyl acetate, 12 parts of monochlorbenzene and 12 parts of tin tetrachloride, or a solution containing about 100 parts by volume of ethylene dichloride, 18 parts of ethyl acetate and 12 parts of tin tetrachloride, a tough, resistant film may be produced upon the pigmented surface of a golf ball by dipping the ball in the solution for about thirty minutes to one hour. During the treatment with this solution or with the solution of tin tetrachloride in ethylene dichloride described above, the surface changes to a light, or dark brown, depending upon the solvents used and the length of time of the treatment.

The ball so treated may be first dipped into a non-reactive solvent such as ethylene dichloride to remove the excess of the reacting solution. This is not always necessary, however, and I prefer to dip it directly into a solvent that reacts with and dissolves the excess of tin tetrachloride, and removes the portion of the halide which has formed the colored product resulting from the treatment of the rubber, balata, etc., surface with the halide of the amphoteric element. By using such a solvent, for example, acetone or ethyl or methyl alcohol or a mixture of these or other solvents that will react with the amphoteric halide part of the addition product, with or without a small quantity of water which is preferably not sufficient to make a mixture in which the ethylene dichloride is insoluble, the discoloration resulting from the reaction of the halide upon the rubber, etc., may be removed, leaving a white, black or other colored article depending upon the composition of the surface. If desired, the ball may be dipped into a series of alcohol or acetone solutions followed by washing in water. If color is of no consequence the colored product need not be changed, that is, the acetone or alcohol washing may be omitted, although the film will then be somewhat more flexible than after the washing step. The halide of the amphoteric element apparently forms addition products with the rubber, etc., from which the halide or at least a portion of it, may be removed by the acetone, etc., leaving a surface made up primarily of polymerized rubber, balata, etc., compounds. The hardness of the surface formed appears to be due to the formation of the polymers of the rubber and/or balata compounds since a portion at least, of the tin tetrachloride is removed by the acetone washing and the amount left, if any, does not apear to affect deleteriously the physical properties of the film.

The article so treated will have a dry, firm film which has a low coefficient of friction and which resists cracking and adheres to the cover upon bending or upon striking, as with a golf club. It is a tough, non-brittle, hard, integral film which may be readily polished and may be repolished when it becomes dulled through use. This polishing may be conveniently accomplished by spreading upon the ball a suitable paste, and holding the ball lightly against a rapidly rotating buffing wheel of leather or wool. The surface treated in this manner takes on a smooth brilliant gloss. Since the film is of uniform thickness the golf ball may be molded for the best flight conditions and the precise contour of the surface may be retained in the finished article. Also the film so produced has greater water resistant properties and even where a rubber and/or balata-pigment cement coating is applied to the cover of the ball, the water will not decrease the adhesion of the coating, as with a painted ball. If the ball is treated directly the film will be integral with the cover and cannot be chipped or flaked off by the blows of the club during play.

My improved procedure is not limited to the immersion of the article into the liquid mixture, since the article may be treated with the vapor of a volatile halide of an amphoteric element, such as tin tetrachloride, or of a mixture of such vapors with other vapors having a diluting effect. Also the reaction retarding substance may be mixed with the rubber mixture rather than with the non-reactive solvent. If such a procedure is followed the boiling point of the substance added should be sufficiently high so that it will not be evaporated during the process of mixing and vulcanizing the material of which the article is made. Furthermore, the article may be painted or sprayed with the treating solutions or washing above described, in place of dipping. Also, the surface which has been treated with the halide of the amphoteric element may be treated with a substance which reacts with the colored products to give the desired color on the finished article. For example, the surface may be treated with tin tetrachloride, after which it may be subjected to the action of ammonia gas or ammonium hydroxide, whereupon the yellow or brown color of the surface will be lost and the original color of the surface will appear.

The treatment with the halide of the amphoteric metal may also be used to advantage upon balls such as squash court balls, etc., to give the ball a thin polishable surface film that is less likely to pick up dirt and to mark the walls of the court. Such a ball may, for example, be dipped for about ten seconds in a 5% solution of tin tetrachloride in ethylene dichloride, after which it may be washed for about 15 minutes in ethylene dichloride or a reactive solvent such as acetone.

My invention is also of importance in the production of other articles where a hard, tough and/or a highly polishable surface is desired. For instance, in the production of heels and tires, etc. it may be desirable to include a black pigment in the surface of the rubber and to treat the article in the manner above described. Such a treatment will result in an article which may be given an initial polish and which may be thereafter repeatedly polished to retain its pleasing appearance. The brittleness of the surface may be controlled by the percentage of the reacting solvent used with the non-reactive solvent for the halide of the amphoteric metal, so that a polishable product may be obtained having the desired flexibility for the use to which it is to be put. In this manner a finished article having a polishable pigmented surface of the desired color may be produced without the addition of discontinuous and non-integral coatings such as paints or varnishes.

The surface resulting from the treatment with tin tetrachloride as described herein is non-thermoplastic and insoluble, so far as I have been able to determine, in any solvent that has yet been discovered. The polymer or addition product remaining in the film is very difficult to oxidize and is resistant to the action of oil and to chemical action so that it provides a protection for the surface upon which it is formed.

The treatment described above is also of importance in the preventing of "bloom" in vulcanized rubber articles, containing free sulphur. The film formed upon the surface of the article by the treatment with the amphoteric halide, even though very thin, will prevent the free sulphur from coming to the surface and so stop the objectionable "blooming." This is of particular importance in the production of black or delicately colored articles where it is desired to add an excess of sulphur, over that which adds to the rubber during the vulcanization, to obtain the desired physical properties, such as high tensile strength. The article may be treated with the amphoteric halide before or after the curing step in the production of the vulcanized article, the vulcanizing or curing being in steam or dry heat. Since the film is not thermoplastic, the molding should precede the treatment with the amphoteric halide.

This procedure may also be used to give oil and water resistance properties to articles such as automobile seat covers, or hose, or layers of rubber to be applied to the inside of tanks or to sheets of metal or to wire, etc. Such articles may, if desired, be treated throughout rather than just on the surface and are particularly adapted for use as an insulation, in wiring motors, etc., where the insulation may come in contact with oil and is subjected to elevated temperatures.

The improved procedure may also be applied to surfaces which have not been pigmented, to improve the characteristics of the surface. Also a surface which has been treated as above described may be coated with an ordinary paint or varnish. Paints and varnishes, which contain linseed or some other drying oil and a drier (usually a metal resinate or linoleate) will dry only very slowly when applied to a vulcanized rubber surface. This is probably due to the presence of free sulphur in the rubber, which comes to the surface and combines with the metal of the drier and thus renders the latter ineffective. Treatment of the rubber surface as described above, before the application of such a paint or varnish, results in the formation of a film of polymerized rubber through which the sulphur cannot penetrate. Therefore, the drier remains unchanged and active, and the drying of the paint or varnish upon such a rubber film is not retarded. It has been found that paint adheres to this film with unusual tenacity.

The term rubber is used in the following claims in an untechnical sense and is intended to include natural or synthetic rubber, rubber isomers and rubber derivatives, crude or deresinized balata, crude or deresinized gutta percha and materials of similar characteristics, used in a compound, together with any other compounding ingredients, singly or as many together as may be desired and in any chosen proportions.

Particular reference has been made to the use of anhydrous tin tetrachloride as the halide of an amphoteric metal. Other anhydrous halogen salts, such as the bromides, fluorides, and iodides of the amphoteric metals may be used. The halide used should be soluble in ethylene dichloride or other non-reactive solvent used. Other amphoteric elements may be used in place of the tin, for example, chlorides or other halogen salts of arsenic, antimony, boron, titanium, iron and aluminum, may be used and will, under proper conditions, react with the rubber, etc., to form new products, very different from ordinary rubber. The cost and ease of handling these halides will determine to a great extent their commercial applicability.

I prefer to use tin tetrachloride for golf balls and other white objects that may be dipped, but with black objects, such as tires, shoes, heels, soles, etc., halides or other amphoteric metals may be preferable. For example, when the article to be treated is large the fuming of the anhydrous tin tetrachloride may be objectionable. Where such articles are dark colored anhydrous ferric chloride ($FeCl_3$) may be used and may be painted or sprayed onto the article in the form of a solution in ethylene dichloride. The solvent may be allowed to evaporate and the article may then be washed with acetone and may be subsequently polished if desired.

In describing the above improvements in the treatment of rubber surfaces, reference has been made to the treatment of relatively soft vulcanized and unvulcanized rubber, etc., surfaces. It may be applied to either vulcanized or unvulcanized surfaces or to surfaces vulcanized with substances other than sulphur such as benzoyl peroxide, nitrobenzene, etc., or to surfaces vulcanized to a higher degree and also to materials of different composition from the examples given, as well as to rubber isomers and rubber derivatives. My improved procedure may be carried out at room temperature although for some purposes it may be desirable to operate at temperatures higher or lower than ordinary room temperature.

This application is in part a continuation of my application Serial No. 208,659, filed July 26, 1927 and my application Serial No. 542,192, filed June 4, 1931. No claim is made herein broadly to the new article described, when produced otherwise than by treatment with a halide of an amphoteric element or its equivalent, since such articles are being claimed in the last mentioned copending application.

The terms and expressions which I have employed are used as terms of description and not of limitation, and I have no intention, in the use of such terms and expressions, of excluding any equivalents of the features described, or portions thereof, but recognize that various modifications are possible within the scope of the invention claimed.

What I claim is:

1. A method for treating a rubber surface, comprising applying to the surface a solution of anhydrous tin tetrachloride in ethylene dichloride.

2. A method for treating a rubber surface, comprising applying to the surface a solution of an anhydrous halide of an amphoteric metal in a solvent which will retard the reaction of the halide with the rubber.

3. A method for treating a rubber surface, comprising applying to the surface a solution of an anhydrous halide of an amphoteric metal in a solvent which reacts with the halide.

4. A method for treating a rubber surface, comprising applying to the surface a solution of an anhydrous halide of an amphoteric metal in a solvent which forms an addition product with the halide.

5. A method for treating a rubber surface, comprising applying to the surface a solution of anhydrous tin tetrachloride in ethyl acetate.

6. A method for preventing bloom in a vulcanized rubber article containing free sulphur, comprising treating the surface of the article with an anhydrous halide of an amphoteric metal.

7. In the preparation of a rubber article, the steps comprising mixing a vulcanizing agent, with the rubber, and subjecting the surface of the rubber to superficial treatment with an anhydrous halide of an amphoteric metal.

8. A method for preparing a white rubber surface, comprising incorporating a white pigment into the rubber of the surface, subjecting the surface to the action of an anhydrous halide of an amphoteric metal and subjecting the surface to the action of a decolorizing substance.

9. A method for treating a rubber surface, comprising applying to the surface a solution of an anhydrous halide of an amphoteric metal in a solvent which is a halide of a hydrocarbon containing at least one hydrogen atom per molecule, and thereafter washing the surface with a solvent which reacts with the addition product of the rubber and the halide of the amphoteric metal.

10. A method for treating a rubber surface, comprising applying to the surface a solution of anhydrous tin tetrachloride in ethylene dichloride and thereafter subjecting the surface to the action of ammonia or ammonium hydroxide.

11. The method of coating golf balls which consists in applying to the article to be coated a rubber paint which includes pigment of the desired color, and then hardening the surface thereof by subjecting it to the action of an organic solution of a halogen salt of an amphoteric metal.

12. The method of coating golf balls which consists in applying to the article to be coated a rubber paint which includes pigment of the desired color, and then hardening the surface thereof by subjecting it to the action of an organic solution of tin tetrachloride.

13. The method of coating articles which consists in applying to the article to be coated a rubber paint which includes pigment of the desired color, and then hardening the surface thereof by subjecting it to the action of a solution of tin tetrachloride in ethylene dichloride.

14. The method of hardening a golf ball surface consisting essentially of rubber and pigment, which method comprises subjecting it to the action of an organic solution of a halogen salt of an amphoteric metal.

15. The method of hardening a golf ball surface consisting essentially of rubber and pigment, which method comprises subjecting it to the action of an organic solution of anhydrous tin tetrachloride.

16. A method of preparing a golf ball surface consisting essentially of rubber and pigment, comprising subjecting it to the action of a halogen salt of an amphoteric element, and washing the surface with a solvent for the halogen salt.

17. A method of preparing a golf ball surface consisting essentially of rubber and pigment, comprising subjecting it to the action of a halogen salt of an amphoteric element, washing the surface with a solvent for the halide and thereafter washing it with an alcohol.

18. A method of preparing a golf ball surface consisting essentially of rubber and pigment, which method comprises subjecting it to the action of a halogen salt of an amphoteric element, and thereafter washing the surface with an alcohol.

19. A method of preparing a golf ball surface consisting essentially of rubber, a pigment and sulphur, comprising vulcanizing the surface and subjecting it to the action of a halide of an amphoteric element.

20. In the production of golf balls having a rubber surface, the step of subjecting the surface of the golf ball to a treatment with an anhydrous halide of an amphoteric element.

21. In the production of golf balls having a rubber surface, the step of subjecting the surface of the golf ball to a superficial treatment with anhydrous tin tetrachloride.

22. In the production of golf balls having a rubber surface, the step of subjecting the surface of the golf ball to a superficial treatment with a solution of an anhydrous halide of an amphoteric element in a solvent which is non-reactive with the halide.

23. In the production of golf balls having a rubber surface, the step of subjecting the surface of the golf ball to a superficial treatment with a solution of an anhydrous halide of an amphoteric element in a non-reactive solvent therefor, which is a halide of a hydrocarbon containing at least one hydrogen atom in the molecule.

24. In the production of golf balls having a rubber surface, the step of subjecting the surface of the golf ball to a superficial treatment with a solution of a halide of an amphoteric element in a non-reactive solvent therefor, which is a halogen derivative of an unsaturated hydrocarbon and which is stable and liquid at ordinary temperatures.

25. In the production of golf balls having a rubber surface, the step of subjecting the surface of the golf ball to a superficial treatment with a solution of anhydrous tin tetrachloride in ethylene dichloride.

26. In the production of golf balls having a rubber surface, the step of subjecting the surface of the golf ball to a superficial treatment with a solution of a halide of an amphoteric element in a mixture of a reactive and a non-reactive solvent therefor.

27. In the production of golf balls having a rubber surface, the step of subjecting the surface of the golf ball to a superficial treatment with an anhydrous halide of an amphoteric element and thereafter washing the surface with a solvent which reacts with the addition product of the halide and the rubber and dissolves the halide.

28. In the production of golf balls having a rubber surface, the step of subjecting the surface of the golf ball to a superficial treatment with an anhydrous halide of an amphoteric element and thereafter washing the surface with a solvent which reacts with the addition product of the halide and the rubber and dissolves the halide and polishing the surface.

29. In the production of golf balls having a rubber surface, the step of subjecting the surface of the golf ball to a superficial treatment with anhydrous tin tetrachloride and thereafter washing the surface with a solvent of the group including acetone and alcohol.

30. In the production of golf balls having a rubber surface, the step of subjecting the surface of the golf ball to a superficial treatment with a solution of anhydrous tin tetrachloride in ethylene dichloride and thereafter washing the surface with acetone.

31. In the production of golf balls having a rubber surface, the steps of immersing the golf ball at ordinary room temperatures in a solution of about 8% anhydrous tin tetrachloride in ethylene dichloride for about 30–45 seconds and thereafter washing the surface of the golf ball in acetone.

32. In the preparation of rubber surfaces, the step comprising subjecting the rubber surface to treatment with an anhydrous halide of an amphoteric element.

33. In the preparation of rubber surfaces, the step comprising subjecting the rubber surface to treatment with anhydrous tin tetrachloride.

34. In the preparation of rubber surfaces, the step comprising subjecting the rubber surface to treatment with a solution of an anhydrous halide of an amphoteric element in a non-reactive solvent therefor which is a halide of a hydrocarbon containing at least one hydrogen atom.

35. In the preparation of rubber surfaces, the step comprising subjecting the rubber surface to treatment with a solution of an anhydrous halide of an amphoteric element in a mixture of a reactive and a non-reactive solvent therefor.

36. In the preparation of rubber surfaces, the step comprising subjecting the rubber surface to treatment with a solution of an anhydrous halide of an amphoteric element in a mixture of normal butyl alcohol and α-chloronaphthalene.

37. In the preparation of rubber surfaces, the step comprising subjecting the rubber surface to treatment with an anhydrous halide of an amphoteric element and thereafter washing the surface with a solvent which reacts with the addition product of the halide and the rubber.

38. In the preparation of rubber surfaces, the step comprising subjecting the rubber surface to superficial treatment with an anhydrous halide of an amphoteric element and thereafter washing the surface with acetone.

39. A golf ball having a cover which consists essentially of rubber and pigment, and which has a hard, smooth, varnish-like, integral surface portion composed of pigment and a chemical addition product of rubber and an anhydrous halide of an amphoteric element.

40. A golf ball having a cover which consists essentially of rubber and pigment, and which has a hard, smooth, varnish-like, integral surface portion composed of pigment and a chemical addition product of rubber and anhydrous tin tetrachloride.

41. A golf ball the outer portion of which has a coefficient of friction substantially lower than that of rubber and which consists essentially of pigment and a chemical addition product of rubber and an anhydrous halide of an amphoteric element.

42. A golf ball the outer portion of which has a coefficient of friction substantially lower than that of rubber and which consists essentially of pigment and a chemical addition product of rubber and anhydrous tin tetrachloride.

43. A golf ball having an outer portion of rubber with a surface film which is formed from the rubber beneath it by treating it with an anhydrous halide of an amphoteric element.

44. A golf ball having a white outer portion of pigmented rubber with a surface film which is formed from the rubber beneath it by treating it with an anhydrous halide of an amphoteric element and washing it with a solvent which reacts with the addition product of the rubber and the halide.

45. A golf ball having a white outer portion of pigmented rubber with a surface film which is relatively harder and formed from the rubber beneath it by treating it with anhydrous tin tetrachloride and washing it with a solvent which reacts with the addition product of the rubber and the chloride.

46. A golf ball as defined in claim 43 in which the halide of an amphoteric element is tin tetrachloride.

47. A golf ball having an outer portion of pigmented rubber with a surface film which is relatively harder and of lower coefficient of friction than the rubber beneath it and which is formed from the rubber beneath it by treatment with a halide of an amphoteric element.

48. A golf ball as defined in claim 47 in which the halide of an amphoteric element is tin tetrachloride.

49. A golf ball having an outer portion of rubber mixed with a vulcanizing agent and a surface film formed from the rubber beneath it by treatment with a halide of an amphoteric element.

50. A golf ball having an outer portion of pigmented rubber with a thin polishable surface film formed from it by treatment of the surface with a halide of an amphoteric element.

51. A golf ball having an outer portion composed largely of a compound of the group consisting of gutta percha and balata and having a surface film which is formed from the gutta percha or balata beneath it by treating it with an anhydrous halide of an amphoteric element.

52. A golf ball having an outer portion composed largely of white pigment and a substance of the group consisting of gutta percha and balata with a surface film which is formed from the gutta percha or balata beneath it by treating it with anhydrous tin tetrachloride and subsequently treating the surface with a solvent that reacts with the addition product of the gutta percha or balata and tin tetrachloride.

53. A golf ball having a cover which comprises rubber and a pigment and which has a surface film harder than the rubber beneath it and capable of taking a high polish, said surface being formed by the treatment of the rubber with a halide of an amphoteric element.

54. A golf ball having a cover which comprises rubber and a pigment and which has a polishable, tough, integral surface film capable of withstanding the abrasive effects of buffing or polishing without impairment of the surface smoothness and formed by treating the surface with a halide of an amphoteric element, and thereafter washing it with a solvent which reacts with the addition product of the rubber and the halide.

55. A golf ball as defined in claim 54 in which the halide is tin tetrachloride.

56. An article having an outer portion of rubber and a surface film formed from it by treatment with an anhydrous halide of an amphoteric element.

57. An article having an outer portion of rubber containing free sulphur with a surface film which is formed from the rubber beneath it by treatment with an anhydrous halide of an amphoteric element.

58. An article having an outer portion of rubber with a surface film of relatively harder polymerized rubber formed from it by treatment with a halide of an amphoteric element.

59. An article having an outer portion of vulcanized rubber with a surface film formed by treatment of the rubber with an anhydrous halide of an amphoteric element.

60. An article having an outer portion of rubber with a surface film formed by treating the rubber with an anhydrous halide of an amphoteric element and thereafter washing it with a solvent which reacts with the addition product of the rubber and the halide.

61. An article as defined in claim 56 in which the anhydrous halide is tin tetrachloride.

62. An article as defined in claim 60 in which the anhydrous halide is tin tetrachloride and the solvent is acetone.

63. An article having an outer portion composed largely of a substance of the group consisting of balata and gutta percha with a surface film which is formed from the balata or gutta percha beneath it by treatment with an anhydrous halide of an amphoteric element.

64. An article having an outer portion composed largely of a substance of the group consisting of balata and gutta percha with a surface film which is formed from the balata or gutta percha beneath it by treatment with an anhydrous halide of an amphoteric element and subsequent treatment with a solvent which reacts with the addition product of the gutta percha or balata and the halide.

65. In the production of an article having a surface composed largely of a substance of the group consisting of balata and gutta percha, the step of subjecting the surface of the article to treatment with an anhydrous halide of an amphoteric element.

66. In the production of a golf ball having a surface composed largely of pigment and a substance of the group consisting of balata and gutta percha, the step of subjecting the surface of the golf ball to treatment with an anhydrous halide of an amphoteric element and thereafter treating it with a solvent which reacts with the addition product of the gutta percha or balata and the halide.

67. In the production of a golf ball having a surface composed largely of white pigment and a substance of the group consisting of gutta percha and balata, the steps of subjecting the surface of the golf ball to a treatment with anhydrous tin tetrachloride and subsequently treating it with a solvent which reacts with the addition product of the gutta percha or balata and the tin tetrachloride.

WILLIAM C. GEER.